United States Patent
Chaneton et al.

(10) Patent No.: US 10,776,846 B2
(45) Date of Patent: Sep. 15, 2020

(54) ASSORTMENT OPTIMIZATION

(71) Applicant: Nike, Inc., Beaverton, OR (US)

(72) Inventors: Juan Chaneton, Cambridge, MA (US);
Gregory Yu, Boston, MA (US);
Vinayak Sachidananda, Lanham, MD (US); Vivek Farias, Newton, MA (US)

(73) Assignee: NIKE, Inc., Beaverton, OR (US)

( * ) Notice: Subject to any disclaimer, the term of this patent is extended or adjusted under 35 U.S.C. 154(b) by 993 days.

(21) Appl. No.: 15/221,537

(22) Filed: Jul. 27, 2016

(65) Prior Publication Data
US 2018/0032934 A1 Feb. 1, 2018

(51) Int. Cl.
| G06Q 30/06 | (2012.01) |
| G06Q 10/06 | (2012.01) |
| G06F 16/2453 | (2019.01) |
| G06F 16/93 | (2019.01) |

(52) U.S. Cl.
CPC ... *G06Q 30/0625* (2013.01); *G06F 16/24535* (2019.01); *G06Q 10/06315* (2013.01); *G06F 16/93* (2019.01)

(58) Field of Classification Search
CPC .. G06Q 10/043; G06Q 10/047; G06Q 16/957; G06Q 10/06315; G06F 16/2453; G06F 16/24534; G06F 16/24549; G06F 16/24539; G06F 16/24547; G06F 16/9535; G06F 16/24535
See application file for complete search history.

(56) References Cited

U.S. PATENT DOCUMENTS

| 6,232,974 B1 * | 5/2001 | Horvitz | G06F 9/50 345/419 |
| 6,366,890 B1 * | 4/2002 | Usrey | G06Q 10/087 705/28 |
| 6,507,834 B1 * | 1/2003 | Kabra | G06F 16/2443 707/718 |
| 7,299,220 B2 * | 11/2007 | Chaudhuri | G06F 16/24556 |
| 7,328,221 B2 * | 2/2008 | Chaudhuri | G06F 16/2462 |
| 7,577,667 B2 * | 8/2009 | Hinshaw | G06F 16/273 |
| 7,594,016 B1 * | 9/2009 | Zhou | G06F 9/5061 709/203 |
| 7,596,523 B2 * | 9/2009 | Sobel | G06Q 40/06 705/36 R |
| 7,610,272 B2 * | 10/2009 | Zurek | G06F 16/283 |
| 7,702,610 B2 * | 4/2010 | Zane | G16H 50/70 707/999.001 |
| 7,886,055 B1 * | 2/2011 | Zhou | H04L 67/1004 709/223 |
| 7,974,976 B2 * | 7/2011 | Yahia | G06Q 30/02 707/708 |
| 7,996,331 B1 * | 8/2011 | Solanki | G06Q 10/04 705/1.1 |

(Continued)

*Primary Examiner* — Tyler W Knox
(74) *Attorney, Agent, or Firm* — Schwegman Lundberg & Woessner, P.A.

(57) ABSTRACT

A scalable architecture to solve assortment problems. Relevant data is loaded into various data stores throughout the architecture. A user specifies the problem using an interactive user interface. A dispatcher process takes the problem and delegates it to individual data stores. The data stores solve their delegated problems and return the results to the dispatcher, which aggregates the results and presents them to the user as an optimal solution to the assortment problem.

20 Claims, 5 Drawing Sheets

(56) References Cited

U.S. PATENT DOCUMENTS

| | | | | |
|---|---|---|---|---|
| 8,065,203 B1* | 11/2011 | Chien | G06Q 10/06315 | 705/28 |
| 8,160,917 B1* | 4/2012 | Solanki | G06Q 10/0637 | 705/7.31 |
| 8,239,245 B2* | 8/2012 | Bai | G06Q 30/0205 | 705/7.11 |
| 8,688,497 B2* | 4/2014 | McMains | G06Q 10/087 | 705/7.25 |
| 8,788,315 B2* | 7/2014 | McMains | G06Q 10/06315 | 705/7.31 |
| 8,812,338 B2* | 8/2014 | Pratt | G06Q 10/063 | 705/7.25 |
| 8,825,506 B2* | 9/2014 | Sankaranarayanan | G06Q 10/06 | 705/7.12 |
| 9,021,094 B1* | 4/2015 | Zhou | G06F 16/24575 | 709/226 |
| 9,053,208 B2* | 6/2015 | Gollapudi | G06F 16/9024 | |
| 10,007,698 B2* | 6/2018 | Delafranier | G06F 16/2453 | |
| 10,037,592 B2* | 7/2018 | Kolb, V | G06T 5/003 | |
| 10,109,004 B1* | 10/2018 | Hawley | G06Q 30/0635 | |
| 10,133,250 B2* | 11/2018 | Kohn | B60L 50/50 | |
| 10,346,432 B2* | 7/2019 | Lipcon | G06F 16/278 | |
| 10,353,900 B2* | 7/2019 | Budalakoti | G06F 16/24556 | |
| 2001/0047293 A1* | 11/2001 | Waller | G06Q 20/203 | 705/22 |
| 2002/0035537 A1* | 3/2002 | Waller | G06Q 40/04 | 705/37 |
| 2002/0147630 A1* | 10/2002 | Rose | G06Q 30/02 | 705/7.31 |
| 2002/0154751 A1* | 10/2002 | Thompson, III | H04M 15/745 | 379/114.01 |
| 2003/0182176 A1* | 9/2003 | Monnerjahn | G06Q 10/04 | 705/7.29 |
| 2003/0195791 A1* | 10/2003 | Waller | G06Q 10/087 | 705/22 |
| 2004/0088241 A1* | 5/2004 | Rebane | G06Q 40/04 | 705/37 |
| 2004/0267676 A1* | 12/2004 | Feng | G06O 30/06 | 705/400 |
| 2005/0060191 A1* | 3/2005 | Parkins | G06Q 50/22 | 705/2 |
| 2005/0114196 A1* | 5/2005 | Schoenmeyr | G06Q 30/0201 | 705/7.29 |
| 2005/0197928 A1* | 9/2005 | Fotteler | G06Q 10/087 | 705/28 |
| 2006/0080641 A1* | 4/2006 | Taylor | G06Q 10/10 | 717/126 |
| 2006/0085387 A1* | 4/2006 | Aggarwal | G06F 16/00 | |
| 2007/0027745 A1* | 2/2007 | Ouimet | G06Q 10/04 | 705/7.31 |
| 2007/0050235 A1* | 3/2007 | Ouimet | G06Q 10/06375 | 705/7.31 |
| 2007/0213851 A1* | 9/2007 | Bellas | G06F 8/433 | 700/34 |
| 2007/0245083 A1* | 10/2007 | Margolus | G06F 11/1096 | 711/114 |
| 2007/0294319 A1* | 12/2007 | Mankad | G06F 11/1662 | |
| 2008/0052268 A1* | 2/2008 | Koudas | G06F 16/24545 | |
| 2008/0294996 A1* | 11/2008 | Hunt | G06Q 30/02 | 715/739 |
| 2009/0047677 A1* | 2/2009 | Frasch | G16B 40/00 | 435/6.18 |
| 2009/0271245 A1* | 10/2009 | Joshi | G06Q 30/0202 | 705/7.31 |
| 2010/0115527 A1* | 5/2010 | Kotlyar | G06F 9/5027 | 718/104 |
| 2010/0145921 A1* | 6/2010 | Stanley | G06F 16/27 | 707/706 |
| 2010/0250329 A1* | 9/2010 | Sanli | G06Q 10/04 | 705/4 |
| 2011/0213894 A1* | 9/2011 | Silberstein | G06F 16/25 | 709/232 |
| 2011/0238459 A1* | 9/2011 | Bottom | G06Q 30/02 | 705/7.29 |
| 2011/0270646 A1* | 11/2011 | Prasanna | G06Q 10/0633 | 705/7.27 |
| 2011/0276364 A1* | 11/2011 | Bergstrom | G06Q 30/0201 | 705/7.29 |
| 2012/0029720 A1* | 2/2012 | Cherian | H02J 3/14 | 700/297 |
| 2012/0084315 A1* | 4/2012 | Schneider | G06F 16/24545 | 707/769 |
| 2012/0123814 A1* | 5/2012 | Bottom | G06Q 10/04 | 705/7.11 |
| 2012/0159459 A1* | 6/2012 | Turner | G06F 8/314 | 717/138 |
| 2012/0215893 A1* | 8/2012 | Bisdikian | G06F 9/5011 | 709/223 |
| 2012/0265744 A1* | 10/2012 | Berkowitz | G06Q 30/0613 | 707/705 |
| 2012/0317059 A1* | 12/2012 | Joshi | G06Q 10/06 | 706/12 |
| 2013/0290758 A1* | 10/2013 | Quick | G06F 1/3243 | 713/323 |
| 2013/0297587 A1* | 11/2013 | Singh | G06F 16/2453 | 707/719 |
| 2013/0325638 A1* | 12/2013 | Auclair | G06Q 30/0639 | 705/14.72 |
| 2013/0325834 A1* | 12/2013 | Simburg | G06F 16/951 | 707/706 |
| 2014/0025420 A1* | 1/2014 | Joshi | G06Q 10/08 | 705/7.23 |
| 2014/0058781 A1* | 2/2014 | Padmanabhan | G06Q 30/0202 | 705/7.22 |
| 2014/0082013 A1* | 3/2014 | Wolf | G06F 16/2453 | 707/769 |
| 2014/0095483 A1* | 4/2014 | Toillion | G06F 16/2455 | 707/722 |
| 2014/0095505 A1* | 4/2014 | Blanchflower | G06F 16/182 | 707/737 |
| 2014/0156633 A1* | 6/2014 | Duan | G06F 16/2453 | 707/713 |
| 2014/0164066 A1* | 6/2014 | Wang | G06O 10/0637 | 705/7.36 |
| 2014/0278981 A1* | 9/2014 | Mersov | G06Q 30/08 | 705/14.53 |
| 2014/0279196 A1* | 9/2014 | Wilson | G06Q 30/0631 | 705/26.7 |
| 2014/0365276 A1* | 12/2014 | Harsha | G06Q 30/0202 | 705/7.31 |
| 2015/0095770 A1* | 4/2015 | Mani | G06N 20/00 | 715/254 |
| 2015/0112762 A1* | 4/2015 | Lahmar | G06Q 30/0202 | 705/7.31 |
| 2015/0120368 A1* | 4/2015 | Agrawal | G06Q 10/06315 | 705/7.25 |
| 2015/0149653 A1* | 5/2015 | Archer | G06F 30/20 | 709/231 |
| 2016/0055452 A1* | 2/2016 | Qin | G06O 10/087 | 705/7.31 |
| 2016/0085643 A1* | 3/2016 | McAlister | G06F 11/203 | 714/4.12 |
| 2016/0147832 A1* | 5/2016 | Sankaranarayanan | G06F 16/2393 | 707/717 |
| 2016/0210640 A1* | 7/2016 | Wu | G06Q 30/0202 | |
| 2016/0275406 A1* | 9/2016 | Chan | G06N 20/00 | |
| 2016/0335586 A1* | 11/2016 | Panchamgam | G06Q 10/087 | |
| 2017/0006135 A1* | 1/2017 | Siebel | G06F 8/10 | |
| 2017/0147964 A1* | 5/2017 | Kothari | G06Q 30/0202 | |
| 2017/0193433 A1* | 7/2017 | Qin | G06Q 10/087 | |
| 2017/0300911 A1* | 10/2017 | Alnajem | G06Q 20/4014 | |
| 2018/0004818 A1* | 1/2018 | Sarma | G06F 16/24568 | |
| 2018/0011912 A1* | 1/2018 | Ul Karimi | G06F 16/254 | |

* cited by examiner

*FIG. 1 – PRIOR ART*

ASSORTMENT OPTIMIZATION

TECHNICAL FIELD

Various embodiments described here generally relate to methods and apparatuses for optimization and, more particularly, but not exclusively, to methods and apparatuses for optimizing the products offered by retailers.

BACKGROUND

Retailers make their money by selling products and therefore seek to maximize the value and volume of products that they sell. Traditionally, retailers attempt to improve product sales by changing the products that they offer in response to recent sales figures, anticipated seasonal trends, industry sales figures, etc. Some retailers with multiple locations further optimize their product mix by considering local and regional data. Many of these changes are done by humans in a piecemeal manner during the merchandizing and planning process rather than being optimized across all stores and the entire assortment of products.

While this process can improve product sales, it fails to fully optimize the product mix offered by retailers. Retail sales preferences can literally change overnight, while the traditional optimization process may occur seasonally or monthly, and even then not take into account the interactions between all the products and stores, for example. Moreover, it is almost impossible for a retail specialist to, e.g., consider shelf space restrictions for every store in a national retail chain.

The problem of optimizing the products offered for sale by a retailer is a generalization of what is commonly referred to as the "knapsack problem." The knapsack problem is: Given a set of items with each item having two values (e.g., weight and price), and a constraint on one of the values (e.g., a knapsack can hold a finite weight), the goal of the "knapsack problem" is to maximize the sum of the other value subject to the constraint (i.e., what is the most valuable combination of items that can be stored in the knapsack without breaking it). There is presently no known polynomial time algorithm for exactly solving this class of problems, so people often rely on approximations. Currently known approximation approaches, e.g., allowing fractional allocations, tend not to work well with very large scale data sets and are typically not useful for obtaining answers in real time.

A need exists, therefore, for optimizing methods and apparatuses that overcome the above-mentioned disadvantages for the classical knapsack problem as well as the retail assortment optimization problem.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Various embodiments relate to methods and apparatus for optimizing product assortment, although one of ordinary skill would recognize that the applicability of the inventions discussed herein is by no means limited to this particular application. One of ordinary skill would recognize that embodiments of the present invention are applicable to "knapsack"-type problems requiring assortment optimization, including but not limited to, optimizing manufacturing inputs, investment portfolio construction, the generation of keys for knapsack cryptosystems, financial instrument construction, and so on.

Generally speaking, embodiments of the present invention use a distributed processing architecture to analyze data sets of tuples (i.e., set of ordered elements, such as [Shoe Red $5]) stored in a plurality of data stores (e.g., structured or unstructured databases). A user operating an interface, such as a graphical user interface, specifies an optimization problem, such as "find the assortment of inventory for stores in the Northeast that maximizes regional revenue." The architecture delegates the problem to the data stores and aggregates the results, providing a scalable solution to "knapsack"-type problems, including both classical knapsack and assortment optimization problems.

In one aspect, embodiments of the present invention relate to a method for assortment optimization using a computer comprising a processor and a memory containing non-transitory instructions configured to be executed by the processor. The method includes receiving a request for an optimal assortment; transforming the received request into a plurality of requests for cost values; transforming each of the plurality of requests for cost values into a plurality of sub-queries for cost values; and servicing each of the sub-queries at a data store, each data store having a computer-readable memory storing a collection of tuples of values and a processor configured to execute a filter operation on the stored collection of tuples and an aggregation operation on the stored collection of tuples.

In one embodiment, the values of each tuple include an item name, a cost, a price, and a quantity.

In one embodiment, the received request includes at least one tag defining a subset of tuples having a value matching the at least one tag, and servicing each of the sub-queries comprises returning a subset of those tuples having a value matching the at least one tag.

In one embodiment, servicing the subquery includes computing the sum of a value function for each tuple having a value matching the at least one tag.

In one embodiment, servicing the subquery includes computing the sum of a value function for each tuple having a ratio of price and cost exceeding the cost value associated with the sub-query and grouping the sum by item. In one embodiment, servicing the subquery further includes testing the sum of the value function against a specified threshold value.

In one embodiment, the data store is a virtual machine.

In one embodiment, the method further includes returning an assortment that is optimal for the specified cost values.

In one embodiment, the data store is a database.

In another aspect, embodiments of the present invention relate to a system for assortment optimization. The system includes at least one data store, a query dispatcher, and a solver. The at least one data store has a computer-readable memory storing a collection of tuples of values; and a processor configured to execute a filter operation on the collection of tuples and an aggregation operation on the collection of tuples. The query dispatcher is in communication with each data store via an interface and includes a processor configured to receive a query for a cost value; formulate at least one sub-query from the received query; and transmit each of the at least one sub-query to a data store. The solver is configured to find an optimal assortment by issuing a plurality of requests for cost values to the query dispatcher.

In one embodiment, the at least one data store is operable as a query dispatcher.

In one embodiment, the at least one query dispatcher is operable as a data store.

In one embodiment, the filter operation selects those tuples from the collection of tuples having a value matching a specified tag.

In one embodiment, the query dispatcher is implemented on a computer that is separate from the at least one computer implementing the at least one data store.

In one embodiment, the processor of the at least one data store is further configured to service a subquery by computing the sum of a value function for each tuple having a ratio of price and cost exceeding the cost value associated with the sub-query and grouping the sum by item. In one embodiment, the processor of the at least one data store is further configured to service a subquery by testing the sum of the value function against a specified threshold value.

In one embodiment, the at least one data store is a virtual machine.

In one embodiment, the at least one data store is a database.

In yet another aspect, embodiments of the present invention relate to a computer-readable medium containing computer-executable instructions for performing a method for assortment optimization. The medium includes computer-executable instructions for receiving a request for an optimal assortment; computer-executable instructions for transforming the received request into a plurality of requests for cost values; computer-executable instructions for transforming each of the plurality of requests for cost values into a plurality of sub-queries for cost values; and computer-executable instructions for servicing each of the sub-queries at a data store, each data store having a computer-readable memory storing a collection of tuples of values and a processor configured to execute a filter operation on the stored collection of tuples and an aggregation operation on the stored collection of tuples.

In one embodiment, the computer-executable instructions for servicing each of the subqueries comprise computer-executable instructions for computing the sum of a value function for each tuple having a ratio of price and cost exceeding the cost value associated with the sub-query and grouping the sum by item.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. Various embodiments will now be described, by way of example, with reference to the accompanying drawings, in which.

DETAILED DESCRIPTION

Figure 1:
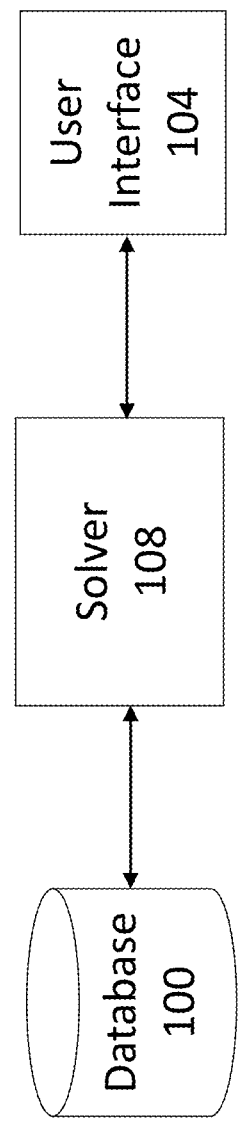
FIG. 1 depicts a prior art system for assortment optimization.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

Features of the present invention provide a scalable architecture to solve assortment problems. Relevant data is loaded into various data stores throughout the architecture. A user specifies the problem using an interactive user interface. A dispatcher process takes the problem and delegates it to individual data stores. The data stores solve their delegated problems and return the results to the dispatcher, which aggregates the results and presents them to the user as the solution to the optimization problem.

Although the features of the invention are described as being implemented in the context of retail sales applications, it is contemplated that they may be implemented in other applications. For example, the features of the invention may be used in any kind of assortment problem: investment management, manufacturing operations, logistics, or any other application involving the maximization of a value subject to one or more constraints.

FIG. 1 illustrates a prior art system for solving assortment problems using, e.g., linear or convex programming techniques. In the prior art, data sets relevant to the problem are loaded into a database 100. The data sets may be arbitrarily large or small, although the size of the data set has a direct effect on the solvability of the assortment problem. An operator uses an interface 104 (e.g., a graphical user interface) to specify an optimization problem which is provider to the solver 108. A typical prior art solver loads the entire data set from database 100 into memory and proceeds to solve for the assortment that optimally satisfies the specified constraints.

This approach, while useful, does have its limits. In particular, data set sizes and databases tend to grow much faster than the memory available to a traditional solver. The result is that certain types of assortment problems cannot be solved optimally in a reasonable time frame with reasonable computing resources using existing methodologies.

Figure 2:
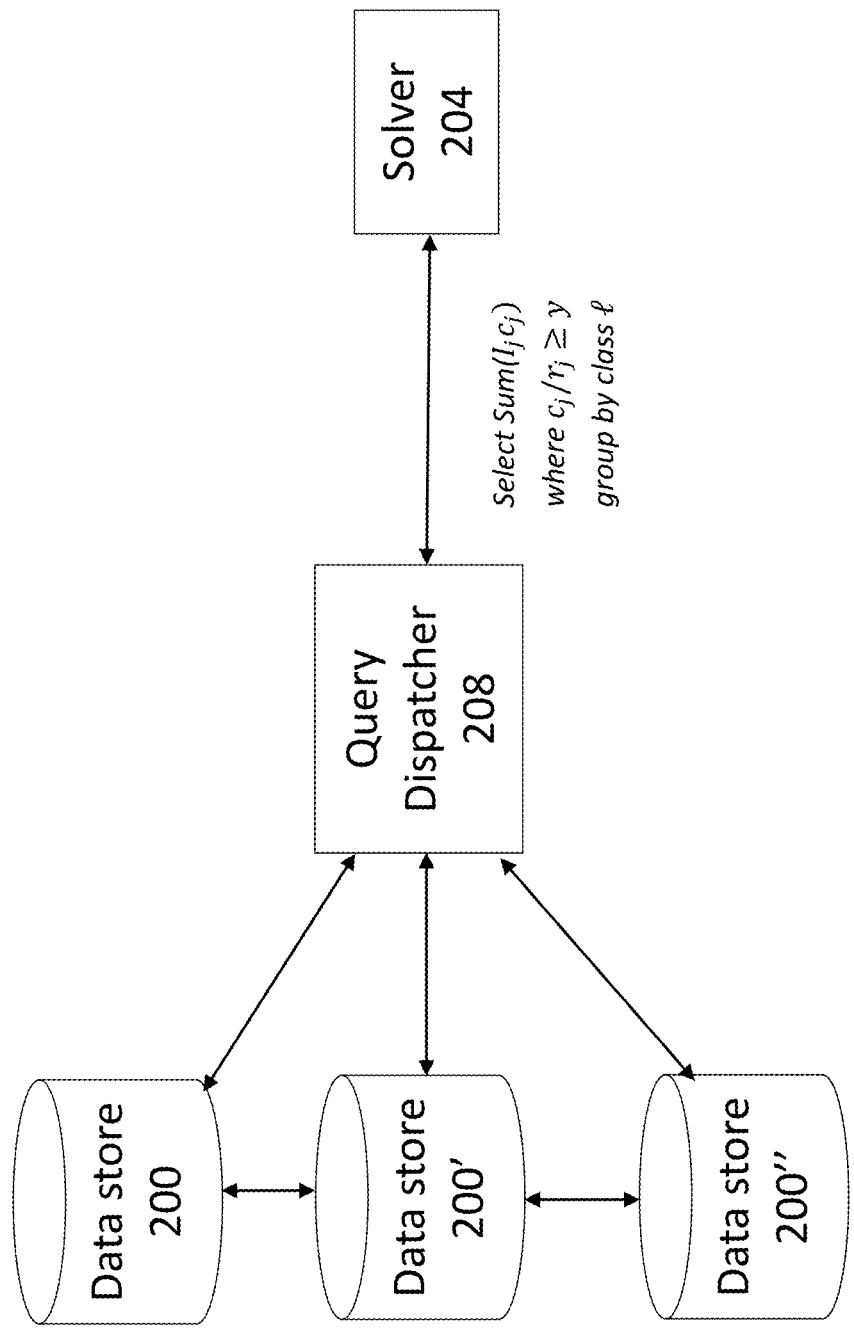
FIG. 2 depicts an exemplary system architecture for assortment optimization in accordance with one embodiment.

FIG. 2 depicts one embodiment of a system for assortment optimization in accord with the present invention. In contrast to the system of FIG. 1, relevant data is stored in a plurality of data stores 200 that may take the form of a structured or unstructured database(s). Each data store 200 is capable of storing data records and performing at least two operations on those records. First, the data store 200 is capable of comparing its records against specified parameters and identifying the subset of those records satisfying those tags, i.e., filtering the records against one or more specified criteria. Second, the data store 200 is capable of returning an aggregate statistic for various groups of its records.

In one embodiment, the relevant data may be stored in the form of "tuples," i.e., ordered lists of elements. One exemplary tuple would take the form (store, product, revenue, cost, etc.). In this particular example, the tuple would be associated with a product in a store. The cost would be the cost of the product, the revenue would be the unit revenue generated by the product, etc.

Like FIG. 1, an operator interacts with an interface (e.g., such as that of FIG. 4) to specify an optimization problem. For example, the interface may let the operator specify one or more parameters ("tags") such as store name, store number, store region, etc., that limit the data analyzed in connection with the servicing of a subquery while computing an optimal assortment. For example, the optimal assortment may only address those tuples having parameters that match some or all of the tags specified by the user.

In lieu of loading the data set into the local storage and/or working memory of the solver 204, as in the prior art, the query dispatcher 208 intermediates between the solver 204 and the data stores 200. In particular, the dispatcher 208 is configured to receive a query for a cost value from the solver 204, transform the query into a plurality of sub-queries for cost values, route those sub-queries to the data stores 200, and process and aggregate responses to the sub-queries from the data stores 200. The solver 204 uses the afore described functionality of the dispatcher 208 to find the optimal cost value, through binary search or other numerical equation solving algorithm. The solver 204 performs this task by requesting one or more cost value queries to the dispatcher 208 and doing computing tasks on the resulting costs.

The data stores 200 receive the sub-queries for cost values and process them by filtering for the subset of their stored records satisfying the constraint specified in the sub-query and returning the aggregate cost for the matching subset of records. Servicing the subquery may include computing the sum of a value function for each data value having a ratio of price and cost exceeding the cost value associated with the sub-query and grouping the sum by item. Servicing the subquery may further include testing the sum of the value function against a specified threshold value.

By issuing a plurality of requests for cost values to the query dispatcher 208, which are in turn processed by the individual data stores 200, the solver 204 finds the optimal assortment without requiring the entirety of the records of the data store 200 to be loaded into the computer hosting the solver 204, either in its memory or any other storage medium local to that computer, in contrast to the prior art system of FIG. 1.

Each element in FIG. 2 may be implemented on a traditional computer having one or more machine-readable storage media such as read-only memory (ROM), random-access memory (RAM), magnetic disk storage media, optical storage media, flash-memory devices, or similar storage media. These computers typically include one or more of a microprocessor, a field programmable gate array (FPGA), application-specific integrated circuit (ASIC), or other similar device(s). In some embodiments, such as those relying on one or more ASICs, the functionality described as being provided in part via software may instead be configured into the design of the ASICs, and as such, any associated software may be omitted. In other embodiments, one or more of the elements in FIG. 2 may be implemented as a virtual machine. In still other embodiments, the elements in FIG. 2 may be arbitrarily grouped or distributed, such that, e.g., one or more of the data stores 200 is operable as a query dispatcher 208, one or more of the query dispatchers 208 is operable as a data store 200, etc.

One of the advantages of the architecture of FIG. 2 is that it is arbitrarily scalable. While traditional solver systems are limited to data sets that can fit into the solver's memory and/or storage media local to the solver's hosting computer, embodiments of the present invention can address arbitrarily large data sets (e.g., in the gigabyte or terabyte range) by adding data stores to accommodate portions the data set. As each data store handles the filtering and aggregation operations for its data, the data traffic between data stores and dispatcher is minimal. To the extent that the collection of data stores is too much to be serviced by a single query dispatcher, additional query dispatchers can be added. As discussed above, in some embodiments a query dispatcher or data store can be added to an existing query dispatcher or data store.

Figure 3:
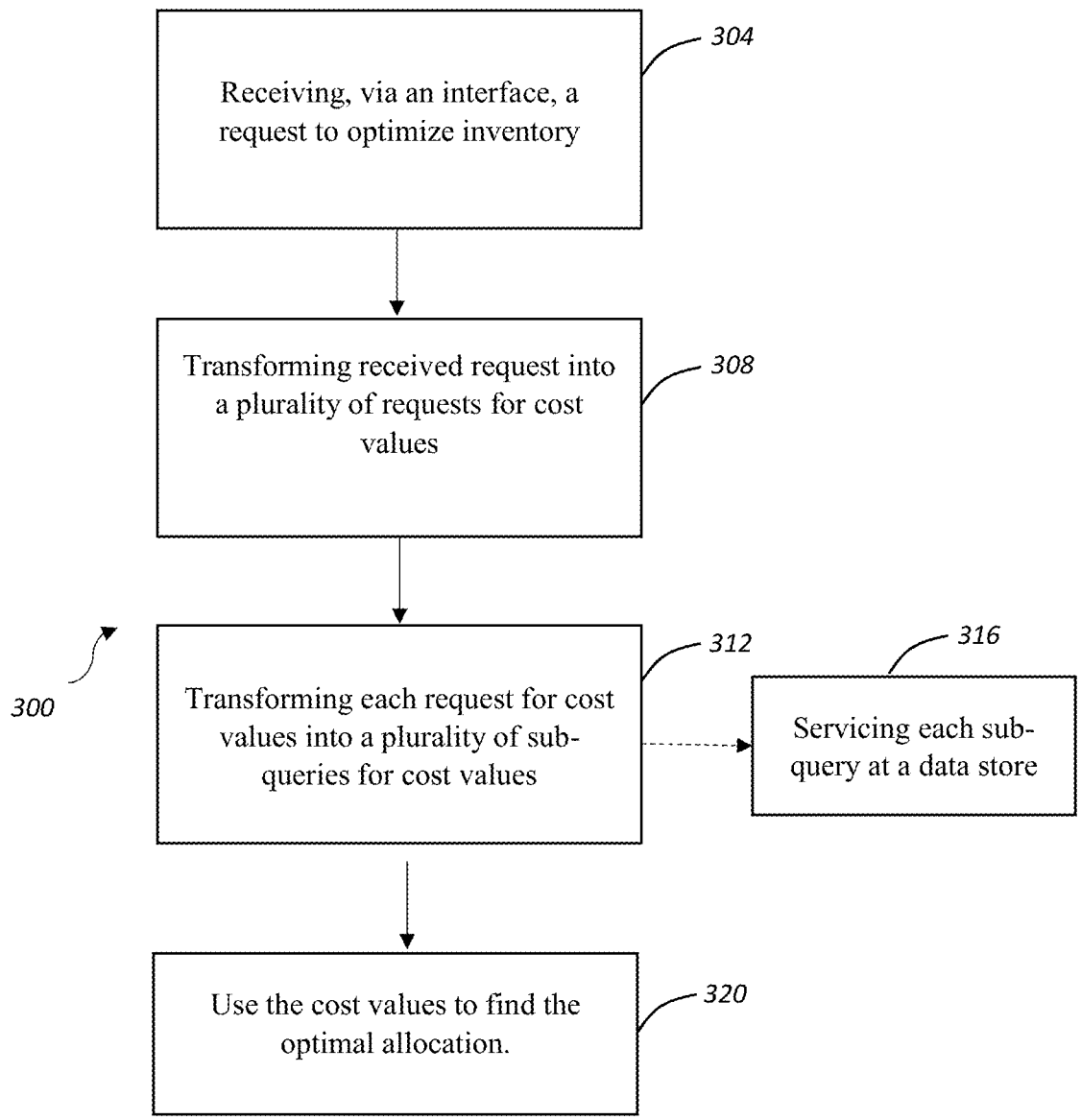
FIG. 3 illustrates a method for assortment optimization in accordance with one embodiment.

FIG. 3 depicts a flowchart of a method 300 for optimizing an assortment in accordance with one embodiment. A user may utilize an interface (e.g., a GUI or user interface 104) to specify an optimization problem, such as a request for an optimal assortment (Step 304) posed to, e.g., a solver 104/204. The received request is transformed into a plurality of requests for cost values (Step 308) by, e.g., a solver 104/204 and conveyed to a query dispatcher 208. Each request for cost values may in turn be transformed into a plurality of sub-queries for cost values (Step 312) by, e.g., a query dispatcher 208. Each sub-query is serviced by a data store (Step 316), such as data store 200. The query dispatcher 208 conveys the result of the cost queries to the solver 204, which uses the retrieved cost values to find the optimal allocation (Step 320).

Figure 4:
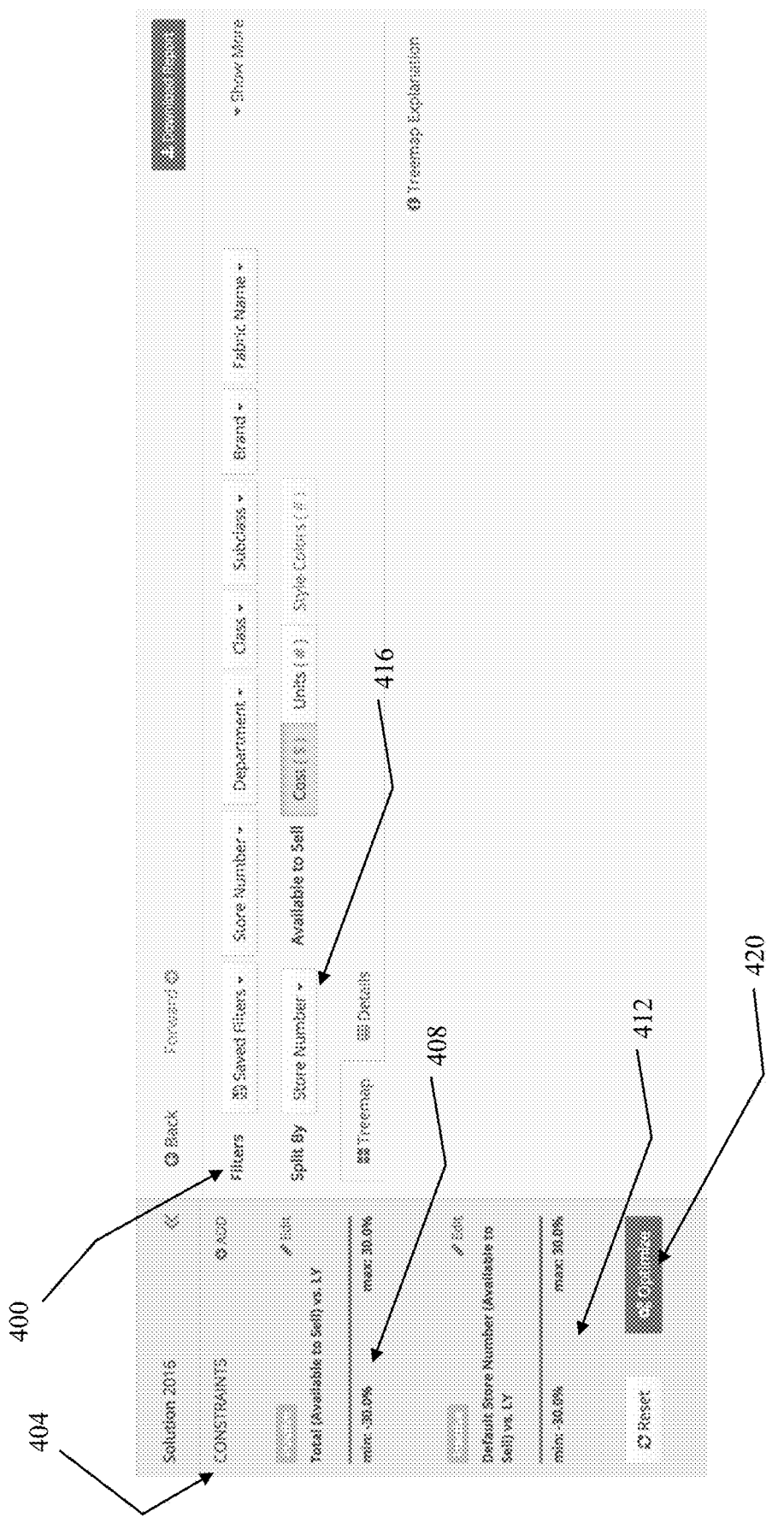
FIG. 4 depicts one embodiment of a user interface for interaction with the system of FIG. 2.

FIG. 4 depicts an embodiment of the user interface for the optimization. The Filters 400 on the top of FIG. 4 (e.g. "Department", "Class", "Subclass", etc.) specify the tags that the user can use to select a subset of tuples to optimize for. The Constraints 404 on the left allow the user to specify constraints on the maximum allowed costs. The Total constraint 408 on the top refers to the cost available for the totality of the products that satisfy the Filters 400. The Store Number 412 sub-constraint in the bottom allows the user to specify maximum costs for each store (if the user desires to specify sub-constraints based on a different tag, this can be achieved by selecting a different tag in the Split By option 416, shown below Filters in FIG. 4. The user triggers the optimization procedure by clicking the Optimize button 420. The results can be provided to the user in graphical and/or numerical format.

Figure 5:
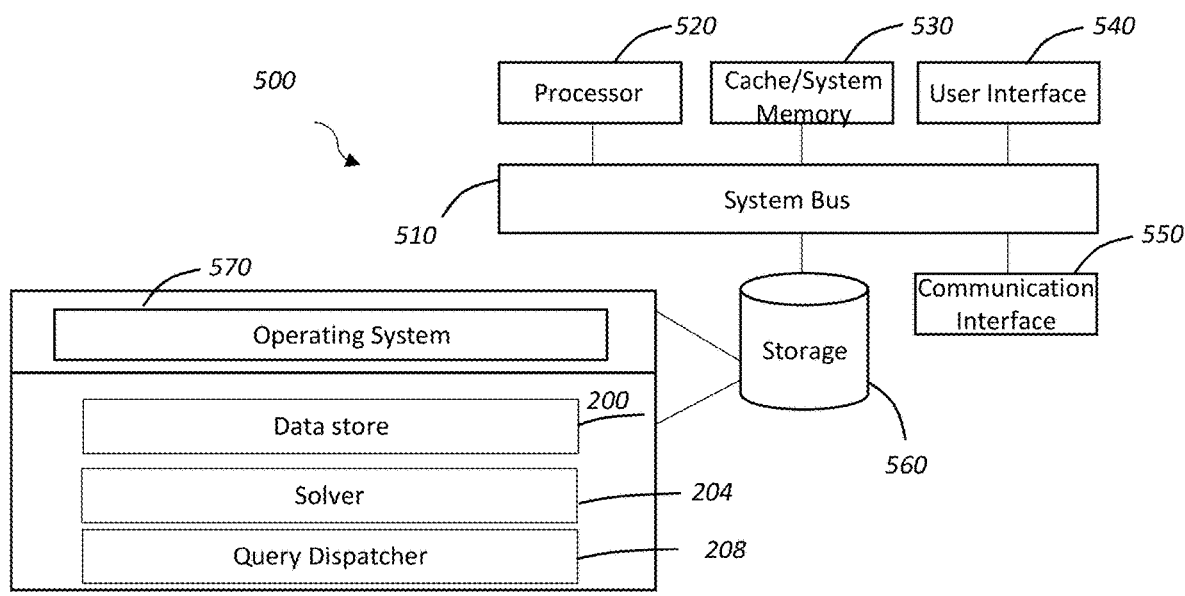
FIG. 5 presents an example of a computer implementing one embodiment of the invention.

FIG. 5 illustrates an example of a hardware system 500 for implementing various devices that may participate in the various methods described herein. As shown in FIG. 5, the hardware 500 includes one or more system buses 510 that connect a processor 520, cache/system memory 530, a user interface 540, a communication interface 550, and storage 560. It will be understood that FIG. 5 is merely exemplary and constitutes, in some respects, an abstraction and that the actual organization of the components of the hardware 500 may vary and be more complex than illustrated.

The processor 520 may be any hardware device capable of executing instructions stored in memory 530 or storage 560 or otherwise processing data. As such, the processor 520 may include a microprocessor, a field programmable gate array (FPGA), application-specific integrated circuit (ASIC), or other similar devices. In some embodiments, such as those relying on one or more ASICs, the functionality described as being provided in part via software may instead be configured into the design of the ASICs and, as such, the associated software may be omitted.

The cache/system memory 530 may include various memories such as, for example, L1, L2, or L3 cache or system memory. As such, the memory 530 may include static random access memory (SRAM), dynamic RAM (DRAM), flash memory, read only memory (ROM), or other similar memory devices.

The user interface 540 may include one or more devices for enabling communication with a user such as a retailer, inventory planner, etc. For example, the user interface 540 may include a display, a mouse, a keyboard, a touchscreen, buttons, camera, microphone, haptic engine, etc. In some embodiments, the user interface 540 may include a command line interface or graphical user interface that may be presented to a remote terminal via the communication interface 550.

The communication interface 550 may include one or more devices for enabling communication with other hardware devices. For example, the communication interface 550 may include a network interface card (NIC) configured to communicate according to WiFi or Ethernet protocols. Additionally the communication interface 550 may implement a TCP/IP stack for communicating according to the TCP/IP protocols. In some embodiments, the communication interface 550 may include an NFC, Bluetooth, or other short range wireless interface. Various alternative or additional hardware or configurations for the communication interface 550 will be apparent.

The storage 560 may include one or more machine-readable storage media such as read-only memory (ROM), random-access memory (RAM), magnetic disk storage media, optical storage media, flash-memory devise, or similar storage media. In various embodiments, the storage 560 may store instructions for execution by the processor 520 or data upon which the processor 520 may operate. For example, the storage 560 may store an operating system 570 for controlling various basic operations of the hardware system 500.

As illustrated, the storage 560 may also store computer-executable instructions that implement the functionality of one or more of the solver 204, query dispatcher 208, and the other components described above.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method for retail assortment optimization using a computer comprising a processor and a memory storing non-transitory instructions configured to be executed by the processor, the method comprising:
   receiving, at a query dispatcher engine and via a graphical user interface (GUI) for specifying one or more filters from a data collection, a request for an optimal assortment of items from the data collection after application of the one or more specified filters;
   transforming, at the query dispatcher engine, the received request into a plurality of requests for cost values;
   transforming, at the query dispatcher engine, each of the plurality of requests for cost values into a plurality of sub-queries for cost values;
   servicing the plurality of sub-queries at a plurality of data stores external to the query dispatcher engine and connected to the query dispatcher engine by one or more data connections, each of the sub-queries being assigned to a data store from the plurality of data stores for servicing that sub-query, each data store having a computer-readable memory storing a collection of tuples of values from the data collection and a processor configured to execute a filter operation on the stored collection of tuples and an aggregation operation on the stored collection of tuples, wherein the filter operation comprises application of the one or more specified filters, wherein servicing a given sub-query comprises computing, at the assigned data store, a sum of a value function for each data value having a ratio of price and cost exceeding a cost value associated with the given sub-query and grouping, at the data store, the sum by item, wherein the data collection is divided among the plurality of data stores, wherein the data collection is not stored at the query dispatcher engine; and
   upon determining that the plurality of data stores is too large to be serviced by the query dispatcher engine, adding, to the query dispatcher engine or to the plurality of data stores, one or more additional query dispatcher engines for servicing the plurality of data stores, wherein the data collection is divided among the plurality of data stores in a collectively exhaustive manner, with each data store storing a portion of the data collection.

2. The method of claim 1 where the values of each tuple include an item name, a cost, a price, and a quantity.

3. The method of claim 1 wherein the received request includes at least one tag defining a subset of tuples having a value matching the at least one tag, and servicing each of the sub-queries comprises returning a subset of those tuples having a value matching the at least one tag.

4. The method of claim 3 wherein servicing the subquery comprises computing the sum of a value function for each tuple having a value matching the at least one tag.

5. The method of claim 1 wherein servicing the subquery comprises computing the sum of a value function for each tuple having a ratio of price and cost exceeding the cost value associated with the sub-query and grouping the sum by item.

6. The method of claim 5 wherein servicing the subquery further comprises testing the sum of the value function against a specified threshold value.

7. The method of claim 1 where the data store is a virtual machine.

8. The method of claim 1 further comprising returning an assortment that is optimal for the specified cost values.

9. The method of claim 1 wherein the data store is a database.

10. A system for retail assortment optimization, the system comprising:
    one or more processors and a memory, the memory storing instructions which, when executed by the one or more processors, cause the one or more processors to perform operations comprising:
    receiving, at a query dispatcher engine and via a graphical user interface (GUI) for specifying one or more filters from a data collection, a request for an optimal assortment of items from the data collection after application of the one or more specified filters;
    transforming, at the query dispatcher engine, the received request into a plurality of requests for cost values;
    transforming, at the query dispatcher engine, each of the plurality of requests for cost values into a plurality of sub-queries for cost values;
    servicing the plurality of sub-queries at a plurality of data stores external to the query dispatcher engine and connected to the query dispatcher engine by one or more data connections, each of the sub-queries being assigned to a data store from the plurality of data stores for servicing that sub-query, each data store having a computer-readable memory storing a collection of tuples of values from the data collection and a processor configured to execute a filter operation on the stored collection of tuples and an aggregation operation on the stored collection of tuples, wherein the filter operation comprises application of the one or more specified filters, wherein servicing a given sub-query comprises computing, at the assigned data store, a sum of a value function for each data value having a ratio of price and cost exceeding a cost value associated with the given sub-query and grouping, at the data store, the sum by item, wherein the data collection is divided among the plurality of data stores, wherein the data collection is not stored at the query dispatcher engine; and upon determining that the plurality of data stores is too large to be serviced by the query dispatcher engine, adding, to the query dispatcher engine or to the plurality of data stores, one or more additional query dispatcher engines for servicing the plurality of data stores, wherein the data collection is divided among the plurality of data stores in a collectively exhaustive manner, with each data store storing a portion of the data collection.

11. The system of claim 10 wherein at least one data store from the plurality of data stores is operable as a query dispatcher engine.

12. The system of claim 10 wherein the query dispatcher engine is operable as a data store from the plurality of data stores.

13. The system of claim 10 wherein the filter operation selects those tuples from the collection of tuples having a value matching a specified tag.

14. The system of claim 10 wherein the query dispatcher engine is implemented on a computer that is separate from at least one computer implementing at least one data store from the plurality of data stores.

15. The system of claim 10 wherein at least one data store from the plurality of data stores is further configured to service a subquery by computing the sum of a value function for each tuple having a ratio of price and cost exceeding the cost value associated with the sub-query and grouping the sum by item.

16. The system of claim 15 wherein at least one data store from the plurality of data stores is further configured to service a subquery by testing the sum of the value function against a specified threshold value.

17. The system of claim 10 wherein at least one data store from the plurality of data stores is a virtual machine.

18. The system of claim 10 wherein at least one data store from the plurality of data stores is a database.

19. A non-transitory computer-readable medium storing computer-executable instructions which, when executed by one or more computers, cause the one or more computers to perform operations for retail assortment optimization, the operations comprising:

receiving, at a query dispatcher engine and via a graphical user interface (GUI) for specifying one or more fillers from a data collection, a request for an optimal assortment of items from the data collection after application of the one or more specified filters;

transforming, at the query dispatcher engine, the received request into a plurality of requests for cost values;

transforming, at the query dispatcher engine, each of the plurality of requests for cost values into a plurality of sub-queries for cost values;

servicing the plurality of sub-queries at a plurality of data stores external to the query dispatcher engine and connected to the query dispatcher engine by one or more data connections, each of the sub-queries being assigned to a data store from the plurality of data stores for servicing that sub-query, each data store having a computer-readable memory storing a collection of tuples of values from the data collection and a processor configured to execute a filter operation on the stored collection of tuples and an aggregation operation on the stored collection of tuples, wherein the filter operation comprises application of the one or more specified filters, wherein servicing a given sub-query comprises computing, at the assigned data store, a sum of a value function for each data value having a ratio of price and cost exceeding a cost value associated with the given sub-query and grouping, at the data store, the sum by item, wherein the data collection is divided among the plurality of data stores, wherein the data collection is not stored at the query dispatcher engine; and upon determining that the plurality of data stores is too large to be serviced by the query dispatcher engine, adding, to the query dispatcher engine or to the plurality of data stores, one or more additional query dispatcher engines for servicing the plurality of data stores, wherein the data collection is divided among the plurality of data stores in a collectively exhaustive manner, with each data store storing a portion of the data collection.

20. The computer-readable medium of claim 19 wherein servicing each of the subqueries comprises computing the sum of a value function for each tuple having a ratio of price and cost exceeding the cost value associated with the sub-query and grouping the sum by item.

* * * * *